United States Patent
Famous

(10) Patent No.: US 8,761,377 B2
(45) Date of Patent: Jun. 24, 2014

(54) ROUTING CONTACT CENTER INTERACTIONS

(75) Inventor: Tod Famous, Ayer, MA (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 13/018,903

(22) Filed: Feb. 1, 2011

(65) Prior Publication Data

US 2012/0195422 A1    Aug. 2, 2012

(51) Int. Cl.
*H04M 3/00* (2006.01)
*H04M 3/51* (2006.01)

(52) U.S. Cl.
CPC .............. *H04M 3/51* (2013.01); *H04M 3/5191* (2013.01)
USPC .................................. 379/265.09; 379/265.02

(58) Field of Classification Search
CPC .............................. H04M 3/51; H04M 3/5191
USPC .......................................... 379/265.01–266.1
See application file for complete search history.

(56) References Cited

U.S. PATENT DOCUMENTS

| | | | |
|---|---|---|---|
| 5,825,869 A | 10/1998 | Brooks et al. | |
| 6,408,066 B1 | 6/2002 | Andruska et al. | |
| 6,546,087 B2 | 4/2003 | Shaffer et al. | |
| 7,315,617 B2 | 1/2008 | Shaffer et al. | |
| 7,599,303 B2 | 10/2009 | Nadeau et al. | |
| 2005/0195960 A1 | 9/2005 | Shaffer et al. | |
| 2008/0025309 A1 | 1/2008 | Swallow | |
| 2010/0027778 A1* | 2/2010 | Kumar et al. | 379/265.09 |
| 2010/0121849 A1* | 5/2010 | Goeldi | 707/736 |
| 2010/0125433 A1 | 5/2010 | Jordan et al. | |
| 2010/0169159 A1* | 7/2010 | Rose et al. | 705/10 |
| 2011/0123015 A1* | 5/2011 | Erhart et al. | 379/265.02 |
| 2012/0166345 A1* | 6/2012 | Klemm | 705/304 |

OTHER PUBLICATIONS

McGee-Smith, Shelia, *Siemens Adds Social Media to Contact Center*, Jul. 19, 2010 accessed via http://www.nojitter.com/blog/225900186.
Riggs, Brian, *Avaya, Cisco, Social Media and Contact Centers*, Jun. 28, 2010 accessed via https://www.nojitter.com/blog/225701733.
Tod Famous, U.S. Appl. No. 12/827,712, filed Jun. 30, 2010.
Tod Famous, U.S. Appl. No. 12/883,983, filed Sep. 16, 2010.

* cited by examiner

*Primary Examiner* — Sonia Gay
(74) *Attorney, Agent, or Firm* — Brinks Gilson & Lione

(57) ABSTRACT

In one implementation, customer service is managed by a contact center. The contact center includes a contact center server and an agent device. The contact center receives a customer service interaction, which may be a phone call, a text, an email, a chat, or a website communication. The contact center server accesses external social media to identify a social media post by a customer. The social media posts contain clues as to the subject matter of the customer service interaction. The social media post may be filtered by the customer names, product identities, and/or the nature of the post. In this way, information derived from the social media post is used to select an appropriate customer service agent to handle the customer interaction.

20 Claims, 5 Drawing Sheets

ROUTING CONTACT CENTER INTERACTIONS

FIELD

The present embodiments relate to routing contact center interactions.

BACKGROUND

Customer call centers field customer calls for technical support, warranty, or other assistance. The customers may be indexed by the customer's phone number, account number, or other identifying information may be used to access the customer's record in a database. The database is populated with information given to the customer call center by the customer. When a problem is resolved, any actions or resolutions are entered into the database by the contact center agent.

The contact center agent may be matched with a customer according to the customer's responses in an interactive voice response (IVR) system. Customers have an aversion to navigating IVR system menus. For example, a rule of thumb for the design of IVR systems is "no more than four wide and three deep." An IVR system that is four options wide and three questions deep outputs no more than twelve outputs to describe the customer's reasons for calling. Many customers also refuse to use IVR systems. Such limitations result in a lack of rich context data about the customer and the customer's reason for calling.

DETAILED DESCRIPTION

Overview

Figure 1:
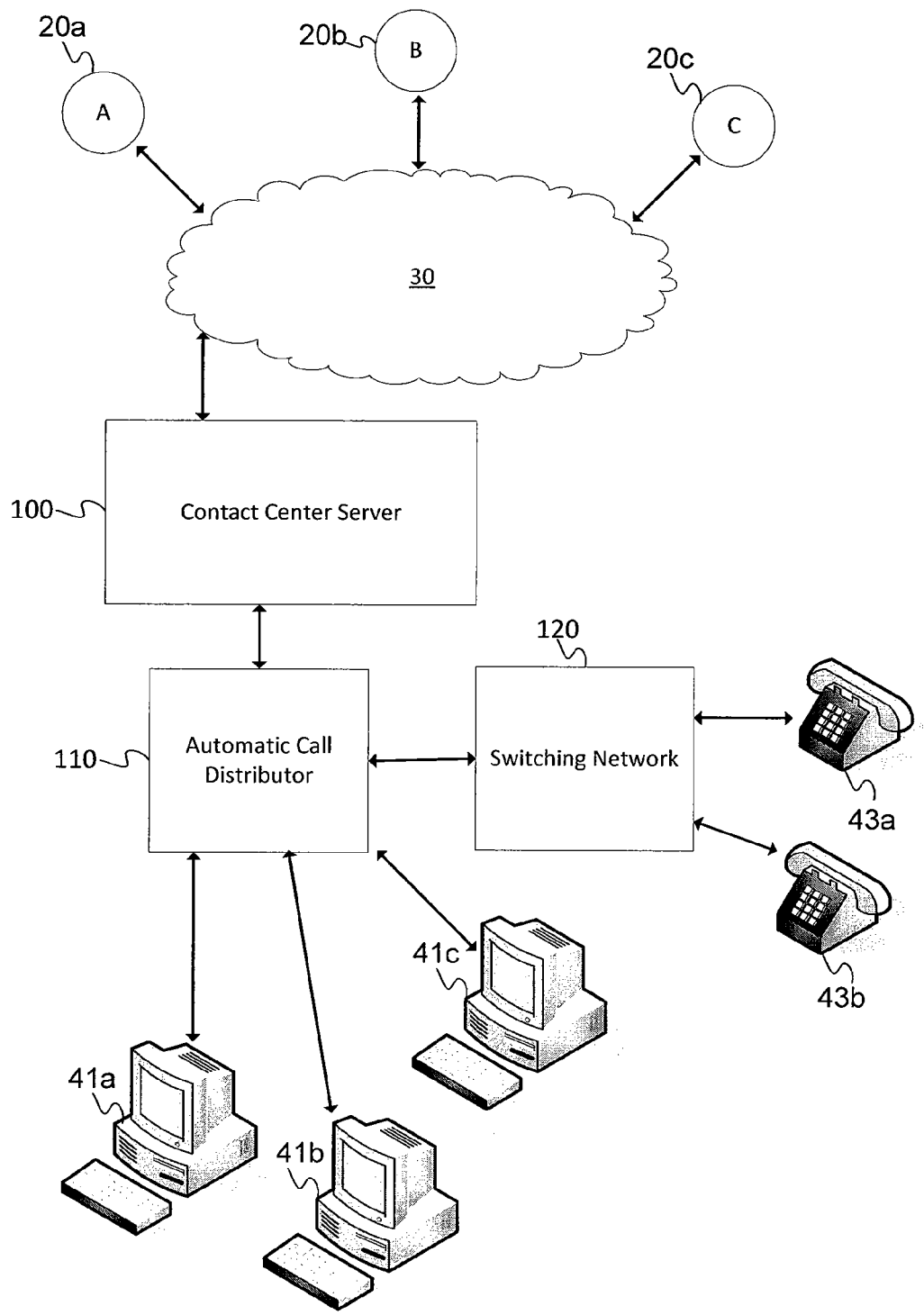
FIG. 1 illustrates one embodiment of a customer contact system.

As the use of social networking services increases, the amount of information people allow others to access also expands. Customer service may be improved by accessing this growing digital footprint. A customer contact center downloads social media posts from social networking services to seek out information about customers. When a customer requests service from the customer contact center, the social media posts are processed to determine what problems or events may be occurring in the customer's life. This information allows the customer contact center to estimate a reason for the request for service and allocate or assign a customer service agent suited for the request.

In one aspect, a method includes receiving a customer service request, determining an identity of a customer from the customer service request, accessing a social media posting based on the identity, and calculating routing information for assigning a customer service agent to the customer service request based on the social media posting.

In a second aspect, an apparatus includes a memory storing a customer database of customer identities and a controller configured to access at least one social media posting based on a customer identity retrieved from the customer database and configured to calculate routing information for selecting a customer service agent based on the social media posting.

In a third aspect, a non-transitory computer readable medium includes software operable to receive a customer service interaction including an identity, access a customer database with the identity to determine a username for an online service, download at least one posting from the online service associated with the username, and assign a customer service agent to the customer service request based on the at least one posting.

Example Embodiments

Social media hosts provide social network services. A social network service may be any service in which the content is generated by the users. Many social network services are websites accessed through a uniform resource locator (URL). Social network services may include a "profile" or "page" for each user to add content, and each user shares the user's profile or page with other users. Some profiles are public and accessible by anyone, while others are private and accessible only by selected other users, which may be referred to as friends or contacts.

Consumers use social network services to communicate. Often, this means that consumers post about the products and services they use, especially when they have a problem. For example, a cell phone customer may comment about poor reception in a particular area, or a television cable customer may comment that his service has been intermittent. Sometimes the posting may describe the particular problem in detail, including the location where the problem occurred, the date, the time of day, the brand/model of the device, and/or the service provider. A customer contact system that taps into the wealth of information available from social network services provides more efficient customer service to customers.

Information from the social media posting may be used to select an agent best suited to handle the customer's request. In one example, the customer may have posted on a social network service about a problem with a particular mobile phone. When the customer initiates a customer service request with the customer contact system of the cellular service provider, the customer contact system accesses the social media post and selects an agent qualified to handle questions regarding the particular mobile phone.

In addition, the information from the social media posting may be combined with input from an IVR system. For example, a customer is having a problem syncing a corporate email account with a smartphone. The customer calls the cellular service provider. From the caller ID, the customer's account is accessed from a database. An IVR system prompts the customer to say or enter "support issue." The customer contact system may not know what model of smartphone the customer is using or the specifics of the problem. However, the customer posted on a smartphone forum earlier that day regarding the email problem. The customer contact system uses information in the customer's entry in the database to locate the forum posting. The customer service request is then routed to an agent with expertise on email synchronization on smartphone devices. In addition, the instructions for such a procedure may be displayed on the agent's workstation.

FIG. 1 illustrates one embodiment of a customer contact system. The customer contact system may include a contact center server 100, a network 30, and an automatic call distributor 110 connected by communication paths. The network 30 may be the Internet or a local area network (LAN). The network 30 provides access to social network services 20a-c to the contact center server 100. Additional or fewer social network services may be used.

The automatic call distributor 110 distributes customer interactions to a plurality of agent phones. One or more of the plurality of phones, including phone 43a and phone 43b, may be connected to the automatic call distributor 110 by way of a switching network 120. The switching network 120 may be the public switched telephone network (PSTN) or a private branch exchange (PBX). The switching network 120 may also include a portion of network 30 for communicating with one or more of the plurality of agent phones using voice over internet protocol (VoIP). Any combination of VoIP, the PSTN, and a PBX may be used. Alternatively or in addition, the automatic call distributor 110 may be in communication with a plurality of agent terminals, including terminal 41a, terminal 41b, and terminal 41c. Each terminal 41a-c may include a phone (e.g. a software-based soft phone) and/or a call center interface for use by the agent.

The automatic call distributor 110 selectively routes incoming communications or interactions to the plurality of phones. The incoming communications may be calls, emails, chats, text messages, or another form of communication. Generally, the incoming communications are from customers who have a need to talk to any agent. The automatic call distributor 110 includes routing logic, which may be implemented in hardware and/or software, for connecting any incoming communication with an agent.

The contact center server 100 provides a routing command, which may be referred to as routing information, to the automatic call distributor 110. The routing information may include a social media component only. Alternatively, the routing information may include an IVR component provided by customer responses to an IVR system and a social media component accessed by the contact center server 100. The contact center server 100 may perform a search on network 30 (e.g. Internet) to access one or more of a plurality of social network services 20a-c. From the social network services 20a-c, the contact center server 100 downloads at least one social network posting or extracted information from a posting. The social media component of the routing command is derived from the at least one social network posting.

The data included in the social network posting may include identification data, activity data, state of mind data, location data, time data, or another type of data. The data included in the social network posting may be filtered. The filtering may used a list of keywords, a language model including phrases, or a contextual model that identifies sentiment of words or combinations of words. The filtering may be industry specific or tailored to each application. The filtering may focus on specific social networking services.

Identification data describes the customer or the product. For example, customer identification data may include a name, nickname, language, dialect, age, birthday, or other information. Product identification data may include a product name, a brand name, a model number, a store name, a website name, or other information.

Activity data describes activities the customer is doing, has done, or plans to do in the future. Activity data may describe the customer's job, a new purchase, a new home, or a vacation. For example, a customer may post on a social networking service about an upcoming trip to Brazil. A customer interaction received at the customer's bank may be routed to an expert in exchange rates and fees associated with changing U.S. dollars to the Brazilian Real. A customer interaction received at the customer's cellular provider may be routed to the department that handles international roaming.

State of mind data includes the customer's opinions, statements, or experiences that may be included in the social media posting. For example, the social media posting may state "I hate company XYZ" or "I think my laptop is broken." Further, this type of information may not be directly stated by the social media posting but derived from the social media posting. For example, the social media posting may state that the customer has just moved, which implies the customer may be seeking particular services, such as utilities.

Location data describes the current or past location of the customer. The location data may be determined from a location post (e.g., an entry in a field for "residence") or a "check-in" service on the social networking service. The location data may be determined automatically, for example, when the customer uses a mobile device configured to update a social network service using the location of the mobile device. In some instances, this is done automatically by geotagging a social media post. The mobile device may include position circuitry to calculate the location of the mobile device. The position circuit may calculate the location using global positioning system (GPS) or triangulation using the strength of signals from cellular towers, wireless access points, or both. The location data may be used to determine language or dialect. The location data may be used to determine routing information for the customer interaction that connects the customer with the nearest store, determines that the customer is away from home, or matches the customer with an agent fluent in an appropriate language or dialect.

Time data includes the time elapsed since or a time at which the social media post was made. The social media post may include a timestamp. The contact center server 100 may calculate the time elapsed since the posting using the timestamp. The time data may be used so that the weight of the impact of the social media post on the routing decision decays over time. For example, a social media post made today is more relevant to the received customer service request that a social media post made yesterday or last week.

Further, the social media component of the routing command may be derived using a matching algorithm comprising a plurality of weights. For example, a weight may assigned to one or more of identification data, activity data, state of mind data, location data, and time data. The weights may be adjusted based on industry or user preference.

The contact center server 100 calculates routing information for assigning a customer service agent to the customer service request based on the social media posting. The agent may be assigned by the contact center server 100 or the contact center server 100 may provide the routing information to the automatic call distributor 110, which assigns the agent and routes the customer interaction. Alternatively, the contact center server 100 and the automatic call distributor 110 may be combined into a single device.

The contact center server 100 uses a matching algorithm. The matching algorithm may match a tag cloud of the social media postings with tag clouds of potential agents. For example, keywords in the social media postings are identified by the contact center server 100 and ranked or otherwise rated based on the number of occurrences or other factors. The contact center server 100 may collect a list of keywords associated with the customer and compare it to a list of keywords associated with each of a plurality of agents. The agent that is the most closely correlates to the customer will be matched with the customer interaction.

Figure 2:
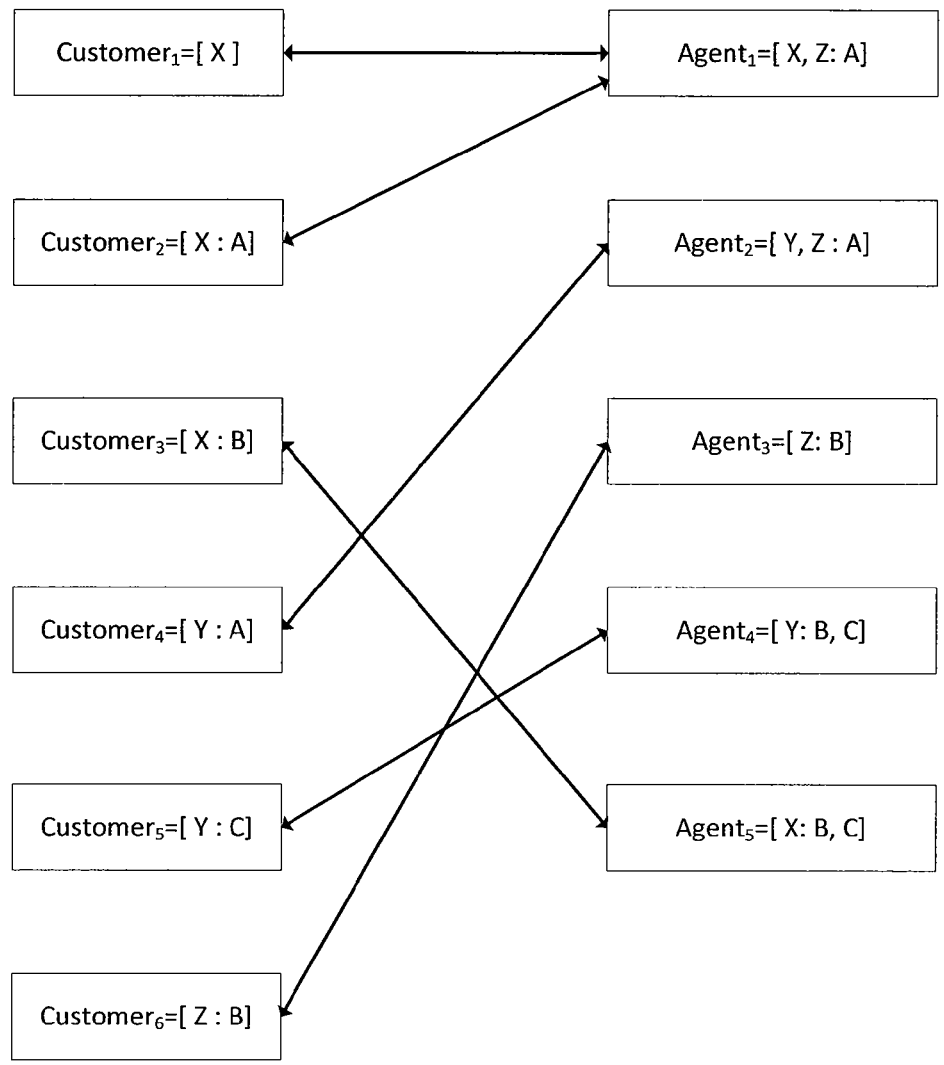
FIG. 2 illustrates an example matching algorithm.

Alternatively, the contact center server 100 or the automatic call distributor 110 may use a vector system for the matching algorithm. The vector system may be a skills-based system. FIG. 2 illustrates an example vector system 200. The vector system 200 includes three products or services, X, Y, and Z, and three types of requests A, B, and C. The routing vectors may include routing information made up of an IVR component and a social media component. For example, X, Y, and Z may be determined from social media postings, and A, B, and C may be determined from IVR or other input. The types of requests A, B, and C may represent sales, technical support, and account maintenance. The example format shown in FIG. 2 is Routing Vector=[social media component: IVR component]. The values A, B, C, X, Y, and Z for the agent vectors may be binary (e.g., represented qualified or not qualified). Alternatively, the values may be normalized (e.g., a value between 0 and 1) or another scaled value (e.g., a value from 1 to 100) in such a way that the agent vectors may be ranked or compared. The agent vectors may be included in an agent skills database, and modified over time through administrator input or automatically through experience or customer feedback.

In this example, six customer interactions have been received from six customers, labeled $Customer_1$ through $Customer_6$. As shown in FIG. 2, each of $Customer_1$ through $Customer_6$ are initiating a customer service request regarding one of products X, Y, and Z. Additionally, $Customer_1$ through $Customer_5$ have specified a type of request. $Customer_1$ did not provide any IVR input. Five agents are available in the customer contact center, labeled $Agent_1$ through $Agent_5$. Many skill based algorithms are possible. One possible matching algorithm matches the customers and agents in the manner shown in FIG. 2. $Agent_1$ has been matched with two customers, which means one of the customers will be placed in $Agent_1$'s queue. Other Customers are matched with other agents based, at least in part, on the information from a social media posting.

The contact center server 100 may receive communication from a customer in a variety of ways. The customer may communicate with the customer contact center 40 using telephone, email, instant message, text message or short message service (SMS), chat room, or another method. The communication identifies the customer. For example, if the communication is telephone call, caller identification (ID) or the IVR system may be employed by the contact center server 100 to identify the customer. The customer center device 100 is configured to access social media postings based on the customer identity.

In addition or alternatively, the contact center server 100 monitors social network services for relevant information from customers. The contact center server 100 may filter the social media postings according to a product identity. The product identity may be a brand name, a service name, a model number or other keywords (e.g., any alphanumeric text, including only numbers, and/or symbols) indicative of a particular product or service or other mining criteria. The contact center server 100 may monitor social network services periodically. For example, the monitoring may occur at a predetermined time, such as every night at midnight. The monitoring may also be limited to a list of known customers or by specific geographic regions.

In another implementation, the contact center server 100 accesses social media postings on the fly, when a direct contact customer service request is received. The social media postings may be accessed based on a trigger. The trigger may be a communication from the customer in the form of a telephone call, email, text message, or chat request.

In one example, the contact center server 100 may include an operating system and a software application. The operating system may be Linux based, Windows based, or another system. The contact center server 100 may be implemented as a virtual machine. The contact center server 100 may be implemented as a customer relationship management (CRM) system.

Figure 3:
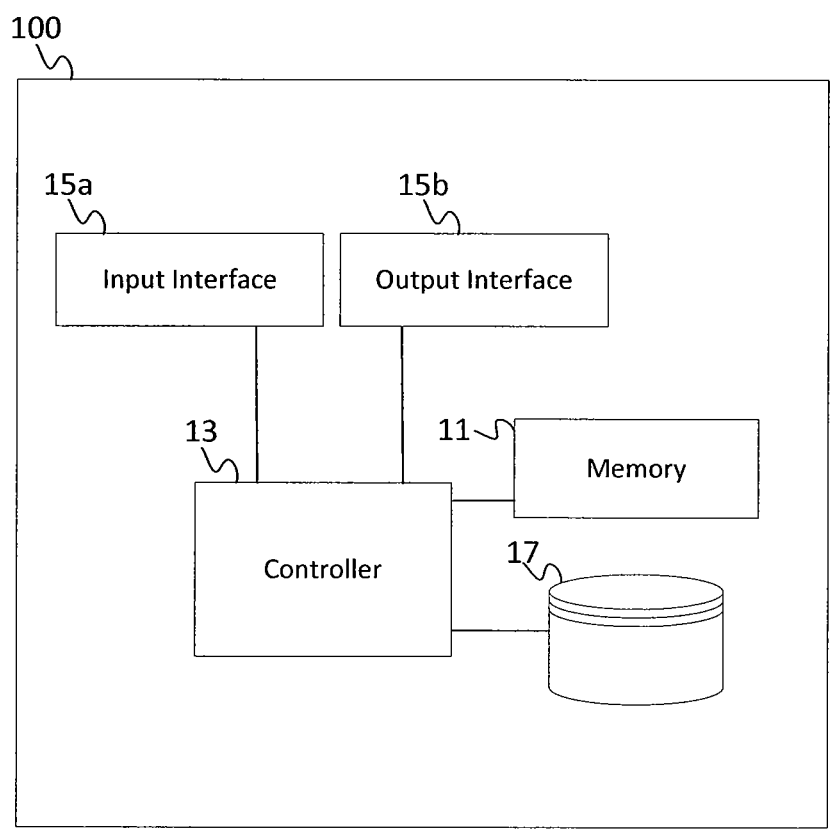
FIG. 3 illustrates an example contact center server in the customer contact system of FIG. 1.

In the embodiment of FIG. 3, the contact center server 100 includes a controller 13, a memory 11, an input/output (I/O) interface 15 (communication interface), and a database 17. Alternatively, the contact center server 10 may be implemented as a personal computer. Additional, different, or fewer components may be provided.

The memory 11 may be any known type of volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 11 may include an optical, magnetic (hard drive) or any other form of data storage device. The memory 11 may be located in a remote device or removable, such as a secure digital (SD) memory card.

The database 17 may be external to the contact center server 10 or incorporated within the contact center server 10. The database 17 may be stored with memory 11 or separately. The database 17 may be implemented as either hardware or software. The agent skills database may be stored by database 17 or memory 11 when the customer center server 100 and automatic call distributor 110 are combined into one device. Alternatively, the agent skills database may be stored by the automatic call distributor 110 or an external storage device.

The memory 11 may store computer executable instructions. The controller 13 may execute computer executable instructions. The computer executable instructions may be included in computer code. The computer code may be stored in the memory 11. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code may stored in one or more tangible media or one or more non-transitory computer readable media for execution by the controller 13 A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 may include a general processor, digital signal processor, application specific integrated circuit, field programmable gate array, analog circuit, digital circuit, server processor, combinations thereof, or other now known or later developed processor. The controller 13 may be a single device or combinations of devices, such as associated with a network or distributed processing. Any of various processing strategies may be used, such as multi-processing, multi-tasking, parallel processing, remote processing, centralized processing or the like. The controller 13 may be responsive to or operable to execute instructions stored as part of software, hardware, integrated circuits, firmware, microcode or the like.

In one embodiment, the controller 13 is configured to access at least one social media posting based on a customer identity retrieved from a customer database and configured to calculate routing information for selecting a customer service agent based on the social media posting. Further, the other functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface 15 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. For example, the I/O interface 15 may comprise a first communication interface devoted to sending data, packets, or datagrams and a second communication interface devoted to receiving data, packets, or datagrams. Alternatively, the I/O interface 15 may be implemented using a single communication interface.

The communication paths 19*a-b* may be any protocol or physical connection that is used to couple a server to a computer. The communication paths 19*a-b* may utilize Ethernet, wireless, or TCP/IP technologies. As used herein, the phrases "in communication" and "coupled" are defined to mean directly connected to or indirectly connected through one or more intermediate components. Such intermediate components may include both hardware and software based components.

The agent device 41 may be a personal computer also including a processor and a memory according to the alternatives above. The agent device 41 may execute software displaying the social media postings accessed by controller 13. The agent device 41 may access a website using a hypertext transfer protocol (HTTP) browser by accessing a URL on contact center server 10. Alternatively, the contact center server 10 and the agent device 41 may be implemented as a single personal computer or server.

Figure 4:
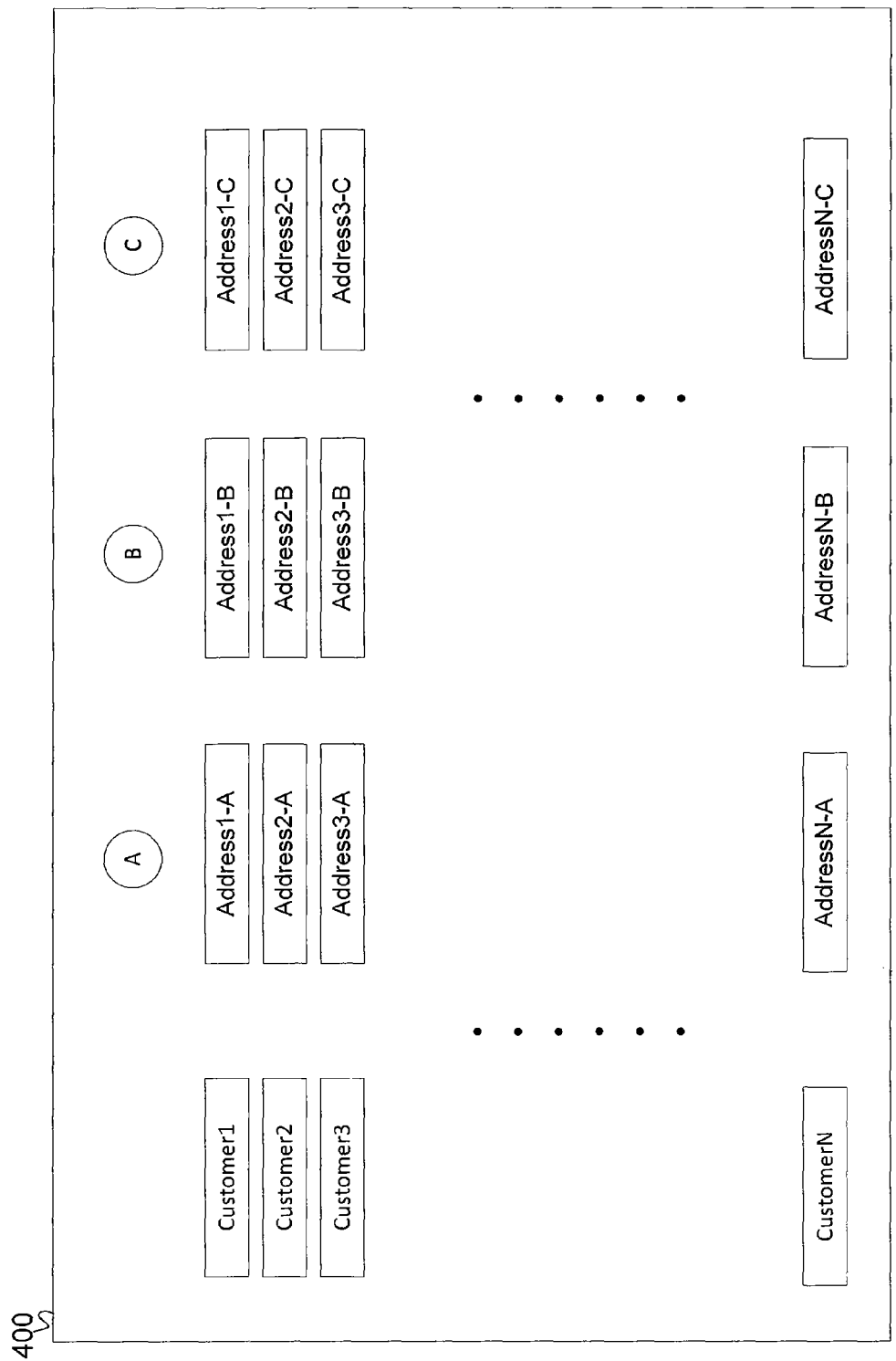
FIG. 4 illustrates an example customer address database coupled with the customer contact center of FIG. 1.

FIG. 4 illustrates a customer address database 400 coupled with the customer contact center of FIG. 1. The customer address database 400 may be stored in database 17 or memory 11. The customer address database 400 includes a list of customer identities. Each customer identity is matched with one or more social network services by username, URL, email address, or other identification. For example, customer1 may be an account number or customer name connected to Address1-A, which is a Facebook URL, Address1-B, which is a twitter ID, and Address1-C, which is a blog URL.

The contact center server 100 may query social media hosts using the address indexed by customer identity in customer address database 400, and the communication interface 15 transmits the social media postings to an external device, such as agent device 41.

Social media postings may be either public or private. Public postings may be accessed simply by knowledge of the customer's name or URL. The customer may disclose the location of public postings through a questionnaire email, a prompt on the IVR system, a warranty card, or by the request of the customer service agent. Public postings may even be located by simply using a search engine with the customer's name or other identification. Another example of public postings is "fanpages" popular on Facebook where customers create social media postings on the fanpage of a particular product, service, or company.

Private postings, on the other hand, may only be accessed with the customer's permission. However, the customer contact center may send an electronic request, such as a friend request, to the customer. The request may be sent in response to the customer disclosing that the customer uses social networking service in a questionnaire email, a prompt on the IVR system, a warranty card, in response to a communication to the contact center, or by the request of the customer service agent.

The customer contact center may have access to some private social media postings that were made on the vendor's web site. For example, some vendors may have forums or message boards where customers post about their successes and problems with products. Other customers or employees of the vendor help them via the message board. These social media postings are particularly relevant to the reason that the customer is contacting a contact center.

Figure 5:
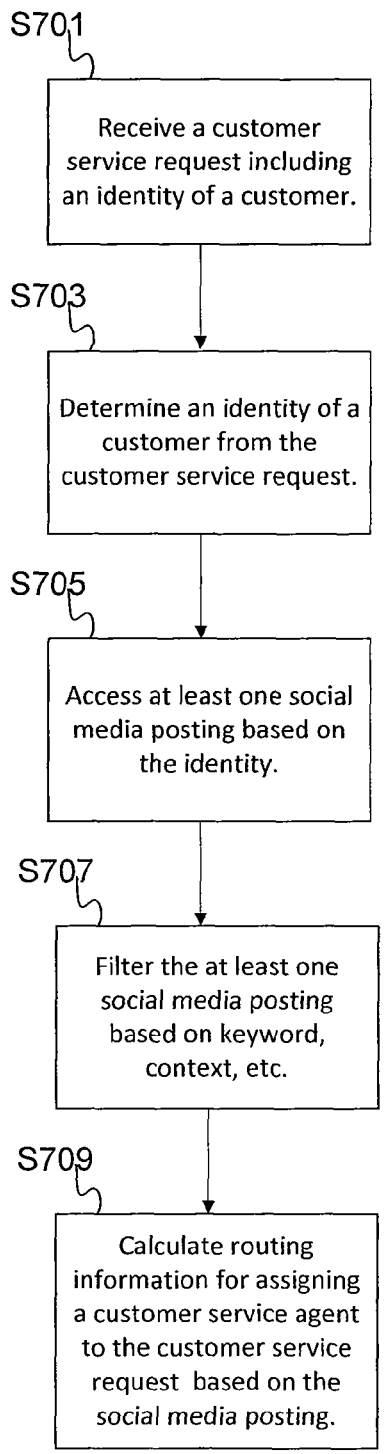
FIG. 5 illustrates one embodiment of a flow chart for routing customer interactions.

FIG. 5 illustrates a flow chart for routing customer center interactions based on social media posts. At S701, the contact center server 100 receives a customer service request. The most common customer service request is a phone call. However, customers may also communicate with the contact center server 100 using an email, a website, a chat request, a text message, or even a message within one of the social media services.

At S703, the contact center server 100 determines an identity of a customer from the customer service request. The identity may be accessed from the customer address database 400 by way of phone number, name, email address or another index. The phone number or name may be obtained through caller ID. The identity is a username or other identification method used by one or more social media services.

At S707, the contact center server 100 downloads and/or filters the downloaded social media postings. The filter may be a list of keywords. The list of keywords may include a list of product names, such as Sony, Apple, and Ford. The list of keywords may include a list of generic names, such as laptop, phone, and car. The list of keywords may include a list of common issues, such as battery life, cracked, and out of gas. The list of keywords may include a contextual model that is used to determine the overall nature of the request, which may be a positive attitude, negative attitude or neutral attitude. A Bayesian filter, such as that used in spam filtering, may be trained according to word probability functions to identity relevant social media posts.

At S709, the contact center server 100 calculates routing information. Rules based matching may be used, such as match on one criteria, then another. Fuzzy logic, similarity, or other matching may be used to match more than one variable. In the case where a separate automatic call distributor is used by the contact center, the routing information is forwarded to the automatic call distributor. In the case where the automatic call distributor functions are performed by the contact center server 100, the contact center server 100 determines a customer service agent to be matched with the customer service request using a matching algorithm. The matching algorithm may be skills based. The matching algorithm may also utilize information from an IVR system in combination with the social media component determined from the social media postings.

Social network services take many forms, each allowing users to create social media postings. One form is a profile based social network service. In a profile based social network service, users create a profile as representations of themselves. The profiles often include photographs, likes and dislikes, and other user generated content. Many profiles also include a contact list used to connect to other users' profiles and access the other users' content. Profile-based social network services focus on the relationships among people, which includes groups of people who share interests or are friends for any reason. Most profile based social network services are accessed via the internet using a URL. The profile based social network establishes connections among users. Examples of profile based social networks include Facebook, MySpace, LinkedIn, and Bebo. Most profile based social networks include an area for comment by the user and by other users. In addition, many profile based social networks include a status message feature, which is an example of a microblog.

The microblog is another form of a social network service. A microblog entry includes an entry relatively small in content as compared with other sources. A microblog entry could consist of a sentence, a sentence fragment, an image, or an embedded video. The most common subject of microblog entries relate to what the user is doing at that moment or that day and what the user is thinking about. Microbloggers often post about their experiences with products and services. A microblogger may complain that his television has stopped working or that his digital video recorder (DVR) is stuck on the wrong time zone. This type of information has particular value to the vendors of the television and DVR. In addition, microbloggers may provide other information about their lives that allow inferences about the customer's problems. Examples of microblogs include the Google Buzz, Facebook status update, Twitter, and Tumblr.

Another form of a social network service is a traditional blog. A blog may relate to any variety of topics often in the form of a personal diary of commentary. Blogs may be accessed by a URL. In addition, some blog hosts provide usernames for user. Examples of blog hosts are Blogger, Wordpress, and Blogspot. Other hosts may be used, such as individually assigned websites.

Another form of a social network service is a community forum. Community forums include any message board where users share ideas and comments. Some community forums focus on a particular product or company. For example, there are message boards related to particular models of cell phone, laptops, and other products. Some companies may host a message board related to the company's products.

A location-based social network service utilizes global positioning systems (GPS) to incorporate users' real world locations into the social network. For example, location based social network services may be access via a GPS enabled mobile device, which may be a cellular phone, a laptop computer, a smart phone, a tablet device, or a personal digital assistant (PDA). Users may comment from the mobile device regarding the products or services available at the users' current locations. The vendors at the users' location may offer coupons or specials to the users. An example of a location based social network service is Foursquare. A location based social network service may integrate with another social network service such as Facebook.

Another form of a social network service is a business oriented social network service, which allows users to maintain a list of contact details of people they know and trust in business and maintain a profile of the user's own business experience. The business oriented social network service may also allow users to post messages. An example of a business oriented social network service is LinkedIn.

Many secondary social network applications provide combined access to one or more of the above social network services. For example, Tweetdeck is an application for Twitter, Facebook, LinkedIn, Google Buzz, Foursquare, and MySpace. In addition, mobile clients such as Tweetie provide similar functionality of smart phones or tablet devices. The embodiments discussed above may include use of secondary social network applications on agent device 41.

Various embodiments described herein can be used alone or in combination with one another. The foregoing detailed description has described only a few of the many possible implementations of the present invention. For this reason, this detailed description is intended by way of illustration, and not by way of limitation.

I claim:
1. A computer-implemented method comprising:
 receiving, at an interface, a first customer service interaction, the first customer service interaction including data from a phone call, text, email, chat, or website post;
 determining, with a processor operatively coupled to the interface, service request information from the first customer service interaction;
 determining, with the processor, an identity of a customer from the service request information;
 accessing, via the interface, social media based on the identity;
 determining, with the processor, social media information from the social media; and
 calculating, with the processor, routing information for a second customer service interaction based on the service request information and the social media information, wherein the routing information is calculated according to vector based matching using at least two vectors, wherein a first vector of the at least two vectors includes two or more factors pertaining to the social media information, and wherein a second vector of the at least two vectors includes two or more factors pertaining to the service request information.

2. The method of claim 1, wherein the two or more factors pertaining to social media information pertain to at least two of timing information derived from the social media information, location information derived from the social media information, state of mind information derived from the social media information, or product information derived from the social media information.

3. The method of claim 1, wherein the routing information for the second customer service interaction includes identification of a customer service agent.

4. The method of claim 1, further comprising: filtering, with the processor, the social media information by at least one aspect of the service request information.

5. An apparatus comprising:
 a memory storing a customer database of customer identities; and
 a controller configured to access a social media posting based on a customer identity retrieved from the customer database, and
 configured to calculate routing information for selecting a customer service agent from among a plurality of customer services agents based on the social media posting and inputted customer information, wherein the routing information is calculated according to a tag cloud based matching algorithm including at least two tag clouds, wherein a first tag cloud of the at least two tag clouds includes one or more factors pertaining to the social media posting, and wherein a second tag cloud of the at least two tag clouds includes one or more factors pertaining to agents of the plurality of customer services agents.

6. The apparatus of claim 5, wherein the controller is further configured to filter the social media posting according to the inputted customer information.

7. A non-transitory computer readable medium encoded with software comprising computer executable instructions and when the software is executed operable to:
receive a first customer service interaction including an identity and user inputted information;
access a customer database with the identity to determine a username for an online service;
download a posting from the online service associated with the username;
filter information of the posting based on the user inputted information, wherein the filtering is according to at least two vectors, wherein a first of the at least two vectors includes two or more factors pertaining to the posting, and wherein a second vector of the at least two vectors includes two or more factors pertaining to the user inputted information; and
assign a customer service agent to a second customer service interaction based on the filtered information of the posting.

8. The method of claim 1, wherein the vector based matching includes using a third vector including two or more agent scores associated with the two or more factors pertaining to the social media information or the two or more factors pertaining to the service request information.

9. The method of claim 8, further comprising determining with the processor whether the two or more agent scores are normalized values pertaining to a qualifications rank of an agent relative to other agents for the second customer service interaction, or whether an agent is qualified or not qualified for the second customer service interaction.

10. The method of claim 1, further comprising determining the routing information with the processor in accordance with ranked base matching of a plurality of customer service interactions with a plurality of customer service agents.

11. The method of claim 1, further comprising the processor adjusting respective weighting of the two or more factors pertaining to the social media information, the two or more factors pertaining to the customer service request information, or a combination thereof in correspondence to signals received via a user interface.

12. The method of claim 1, further comprising the processor automatically adjusting respective weighting of the two or more factors pertaining to the social media information, the two or more factors pertaining to the service request information, or a combination thereof according to feedback resulting from routing of the second customer service interaction.

13. The apparatus of claim 5, wherein the second tag cloud includes agent scores associated with factors pertaining to the social media posting.

14. The apparatus of claim 13, wherein the scores are normalized values pertaining to a qualifications rank of an agent relative to other agents for assisting a corresponding customer or whether an agent is qualified or not qualified for assisting a corresponding customer.

15. The apparatus of claim 5, wherein the routing information is calculated in accordance with ranked base matching of a plurality of customer service interactions with a plurality of customer service agents.

16. The apparatus of claim 5, wherein weighting of the one or more factors pertaining to the social media posting is manually adjustable by signals received via a user interface or adjustable by a processor according to feedback resulting from use of the routing information.

17. The non-transitory computer readable medium of claim 7, wherein the first vector includes timing information derived from the posting and the second vector includes timing information derived from the user inputted information.

18. The non-transitory computer readable medium of claim 7, wherein the first vector includes location information derived from the posting and the second vector includes location information derived from the user inputted information.

19. The non-transitory computer readable medium of claim 7, wherein the first vector includes product information derived from the posting and the second vector includes product information derived from the user inputted information.

20. The non-transitory computer readable medium of claim 7, wherein the first vector includes state of mind information derived from the posting and the second vector includes state of mind information derived from the user inputted information.

* * * * *